(12) United States Patent
Meiniel et al.

(10) Patent No.: US 8,463,807 B2
(45) Date of Patent: Jun. 11, 2013

(54) AUGMENTED SEARCH SUGGEST

(75) Inventors: Philippe Meiniel, Maule (FR); Alexis L. Naibo, Levallois-Perret (FR)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/206,783

(22) Filed: Aug. 10, 2011

(65) Prior Publication Data

US 2013/0041915 A1    Feb. 14, 2013

(51) Int. Cl.
*G06F 17/30* (2006.01)
(52) U.S. Cl.
USPC .......................................... 707/767
(58) Field of Classification Search
USPC ......................... 707/706, 765, 767
See application file for complete search history.

(56) References Cited

U.S. PATENT DOCUMENTS

| | | | |
|---|---|---|---|
| 2003/0221068 A1 | 11/2003 | Tsuji et al. | |
| 2004/0254928 A1* | 12/2004 | Vronay et al. | 707/5 |
| 2006/0004739 A1* | 1/2006 | Anthony et al. | 707/4 |
| 2006/0206454 A1* | 9/2006 | Forstall et al. | 707/3 |
| 2007/0088681 A1 | 4/2007 | Aravamudan et al. | |
| 2007/0094042 A1 | 4/2007 | Ramer et al. | |
| 2008/0098173 A1 | 4/2008 | Chidambaran et al. | |
| 2008/0301128 A1* | 12/2008 | Gandert et al. | 707/5 |
| 2009/0144234 A1* | 6/2009 | Sharif et al. | 707/3 |
| 2009/0276417 A1* | 11/2009 | Shapira et al. | 707/5 |
| 2010/0325100 A1* | 12/2010 | Forstall et al. | 707/706 |
| 2011/0047120 A1* | 2/2011 | Kamvar et al. | 706/50 |
| 2011/0238645 A1* | 9/2011 | Zhang et al. | 707/706 |
| 2012/0197864 A1* | 8/2012 | Bourdoncle et al. | 707/711 |

OTHER PUBLICATIONS

Jesse Ambrose et al., "Non-Final Office Action" dated Jul. 5, 2012, for U.S. Appl. No. 13/108,274, entitled "Method and System for Multi-Tiered Search Over a High Latency Network", filed May 16, 2011, 17pgs.
Jesse Ambrose et al., "Non-Final Office Action" dated Jun. 23, 2010, for U.S. Appl. No. 12/204,778, entitled "Method and System for Multi-Tiered Search Over a High Latency Network", filed Sep. 4, 2008, 11pgs.

* cited by examiner

*Primary Examiner* — Cam-Linh Nguyen
(74) *Attorney, Agent, or Firm* — Buckley, Maschoff & Talwalkar LLC (57) ABSTRACT

A system includes reception of a partial query from a user, querying of a data source with the partial query to identify terms within the data source including the partial query, storage of the identified terms in a cache associated with the user, presentation of the identified terms to the user, reception of a new partial query including the partial query and a letter appended to the partial query, and determination of whether one or more of the stored identified terms includes the new partial query.
If one or more of the stored identified terms includes the new partial query, the one or more of the stored identified terms are presented to the user, and, if none of the stored identified terms includes the new partial query, then the data source is queried with the new partial query to identify second terms within the data source including the new partial query, the identified second terms are stored in the cache associated with the user, and the identified second terms are presented to the user.

18 Claims, 9 Drawing Sheets

AUGMENTED SEARCH SUGGEST

BACKGROUND

Techniques for searching large data repositories have become commonplace. For example, according to conventional search modalities, a user types a search query composed of one or more search terms, a search engine identifies relevant data from a data repository data based on the search query and on a searching algorithm, and the identified data is returned to the user as search results.

Some conventional searching systems monitor the characters typed by the user and contemporaneously suggest search terms based on the characters. Typically, the suggested search terms are generated by querying a remote database of previously-entered queries while the characters are being typed and/or by comparing the typed characters to search queries which have been previously input by the user and which are stored locally.

Enterprise software systems receive, generate, and store data related to many aspects of a business enterprise. In some implementations, this data may relate to marketing, sales, customer relations, supplier relations, inventory, human resources, and/or finances. Analytical tools, such as reporting systems, are commonly used to present such enterprise data to users in useful formats.

Enterprise systems may interact with a semantic layer including a set of abstract entities known as business objects. Each business object associates one or more physical entities (e.g., a physical database table, associated columns of one or more database tables) of one or more enterprise data sources with user-friendly names. The user-friendly names may represent business entities, such as customers, time periods, financial figures, etc. Business objects may be classified as dimensions along which one may want to perform an analysis or report (e.g., Year, Country, Product), details (e.g., additional information on dimensions), and measures (e.g., Sales, Profit) whose values can be determined for a given combination of dimension values. In order to effectively search an enterprise system, a user would prefer to use these user-friendly names instead of references to specific physical entities of the data sources.

The above-described search suggestion mechanisms are often insufficient in the case of enterprise systems. First, repetitive querying of a remote database of previously-entered queries would slow overall system performance. Also, even if remotely- or locally-stored prior search queries could be efficiently retrieved, a user is unable to evaluate the relevance of these retrieved terms to the underlying enterprise data. Moreover, a same term may possess two or more semantic meanings within an enterprise system (e.g., "Paris" may be a city, a name, a portion of an item description, etc.), and conventional search mechanisms do not efficiently allow a user to distinguish between these meanings based on the contents of the enterprise system.

Conventional suggestion mechanisms also fail to implement any access management. For example, previously-entered queries are retrieved from a remote database without regard to the user to whom the queries will be presented.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
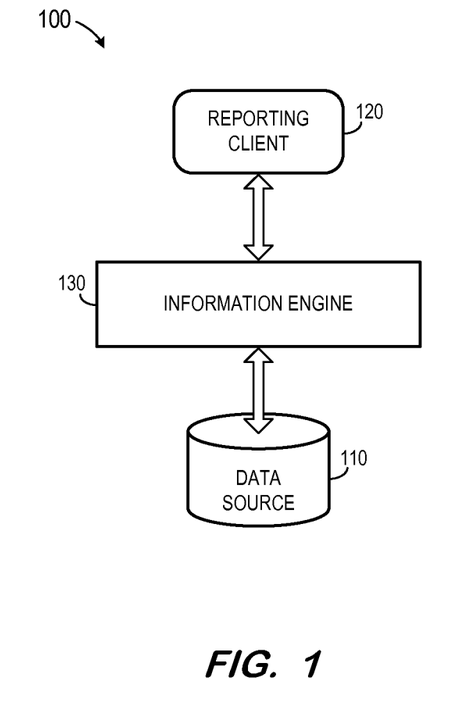
FIG. 1 is a block diagram of a system according to some embodiments.

FIG. 1 is a block diagram of system 100 according to some embodiments. System 100 includes data source 110, reporting client 120, and information engine 130. Reporting client 120 may comprise a device executing program code of a software application for presenting user interfaces to allow interaction with information engine 130. Presentation of a user interface may comprise any degree or type of rendering, depending on the type of user interface code generated by information engine 130. For example, reporting client 120 may execute a Web Browser to receive a Web page (e.g., in HTML format) from information engine 130, and may render and present the Web page according to known protocols. Reporting client 120 may also or alternatively present user interfaces by executing a standalone executable file (e.g., an .exe file) or code (e.g., a JAVA applet) within a virtual machine. System 100 may include any number of reporting clients 120 of one or more types according to some embodiments.

Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other structured data storage system. The data of data source 110 may be distributed among several relational databases, dimensional databases, and/or other data sources. Embodiments are not limited to any number or types of data sources. For example, data source 110 may comprise one or more Online Analytical Processing databases, spreadsheets, etc. Data source 110 may comprise a physical and/or an in-memory (e.g., in Random Access Memory) database, or any other type of data source that is or becomes known. The data stored in data source 110 may be received from disparate sources (not shown).

To provide economies of scale, data source 110 may include data of more than one customer. In such an implementation, information engine 130 includes mechanisms to ensure that a client accesses only the data that the client is authorized to access. Moreover, the data of data source 110 may be indexed and/or selectively replicated in an index to allow fast searching and retrieval thereof.

Information engine 130 generally provides data of data source 110 to reporting client 120. The data may be provided based on semantic layer metadata defining objects which are mapped to logical entities of data source 110. The metadata may be stored in data source 110 and/or a separate repository (not shown). According to one example, specifications of reports (or other visualizations) include queries which are filtered on one or more objects defined by the metadata. Information engine 130 receives such a query, generates an SQL script based on the query, and forwards the SQL script to data source 110. Data source 110 returns a data set based on the SQL script, and information engine 130 creates a report/ visualization based on the specification and the returned data set.

Reporting client 120 may also provide a search function for searching data source 110 based on search terms input by a user. Similarly to that described above, information engine 130 receives the search terms, generates an SQL script based on the search terms, forwards the SQL script to data source 110, receives a data set from data source 110 based on the SQL script, and returns the data set to reporting client 120.

Figure 2:
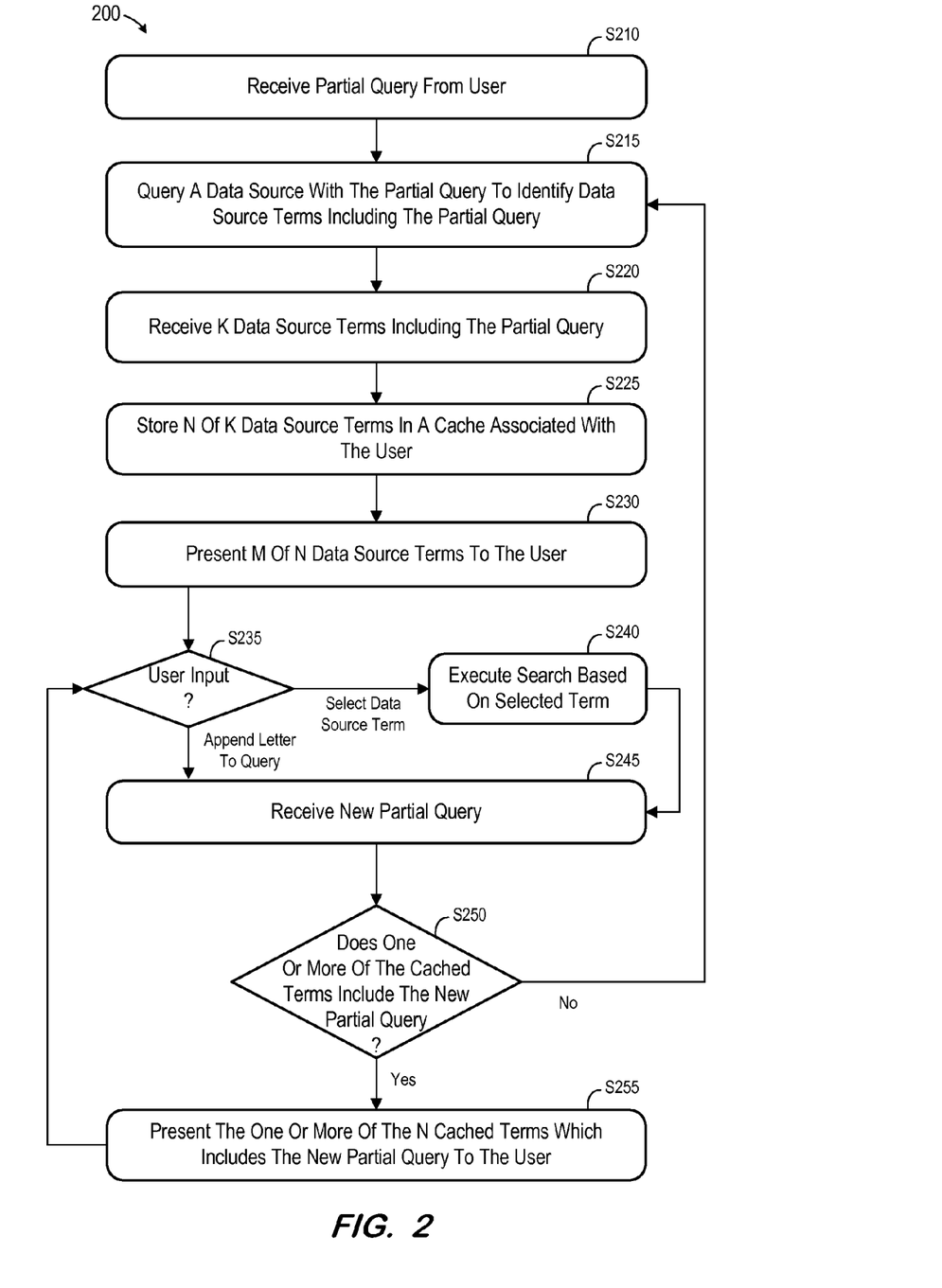
FIG. 2 illustrates a flow diagram of a process according to some embodiments.

FIG. 2 comprises a flow diagram of process 200 according to some embodiments. In some embodiments, various hardware elements of application server 110 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a partial query is received from a user. The partial query may include any number of characters. According to some embodiments, the partial query must include at least three letters before proceeding to S220.

Figure 3:
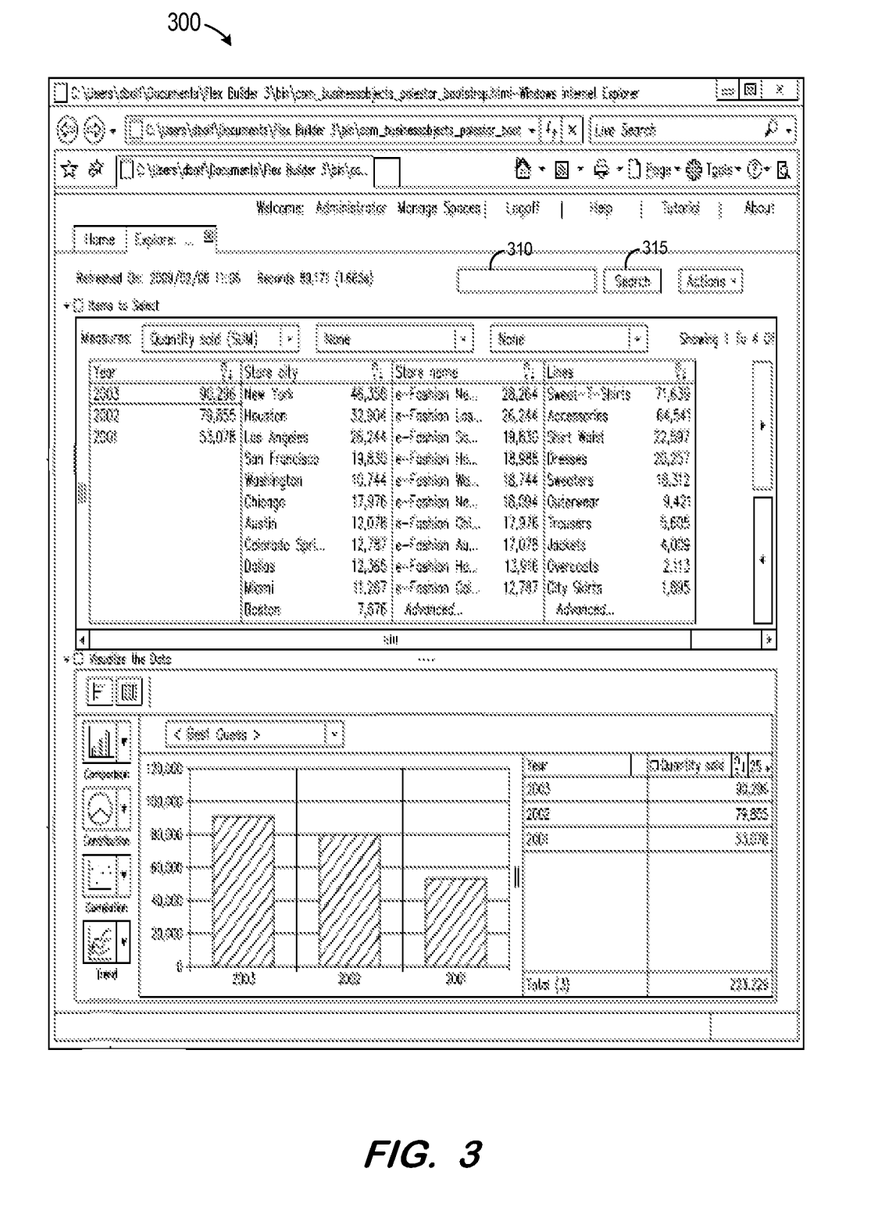
FIG. 3 is a view of a user interface according to some embodiments.

FIG. 3 illustrates interface 300 to receive a partial query from a user in one embodiment of S210. Interface 300 may be a Web page provided by information engine 130 in response to a request from reporting client 130. Again, any client application may be used to display interface 300, which is not limited to Web-based formats.

Interface 300 presents measures (e.g., Quantity sold (SUM)) associated with various dimension values. Interface 300 also displays a corresponding graphic visualization. Information engine 130 may determine the presented information using SQL queries on data source 110. Embodiments are not limited to use in an application as illustrated in FIG. 3. For example, an embodiment might only provide functionality relating to searching as described herein.

The user may input the partial query into input field 310 at S210. Next, and without requiring the user to select Search icon 315, a data source is queried with the partial query at S215 to identify data source terms including the partial query. The data source terms may include dimension names, dimension values, measure names, detail names, and other text data which are stored in the data source. In response to the query, a number (K) of data source terms including the partial query is received at S220, and a number (N) of the K data source terms are stored in a cache at S225.

According to the present example, information engine 130 receives the partial query at S210, queries data source 110 at S215 to identify data source terms including the partial query, receives K data source terms at S220, and stores N of the K data source terms in the cache at S225. N may be less than or equal to K in order to provide a limit on the number of stored terms.

The cache may be located in information engine 130 and/or reporting client 120. Moreover, the cache may be uniquely associated with the user from whom the partial query was received. In this regard, the query may be executed at S215 under the user's authorization credentials. Accordingly, the received K data source terms (as well as the stored N data source terms) do not include terms that the user is not authorized to access.

The stored N data source terms may be the N highest-ranked of the K terms according to relevance score. The score may be based on a Lucene score returned with the query results, but embodiments are not limited thereto.

Figure 4A:
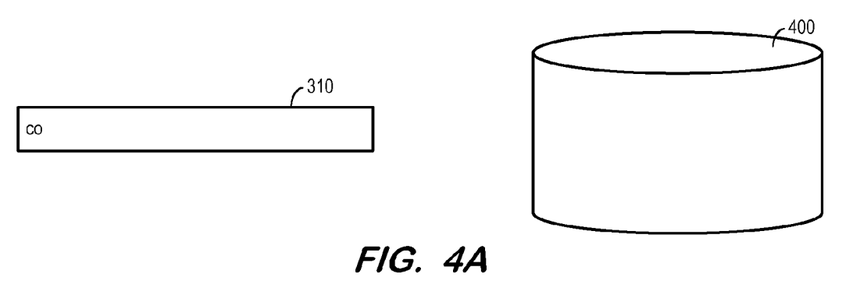
FIGS. 4A through 4J comprise views of a search interface and a data cache to describe search term suggestion according to some embodiments.
Figure 4B:
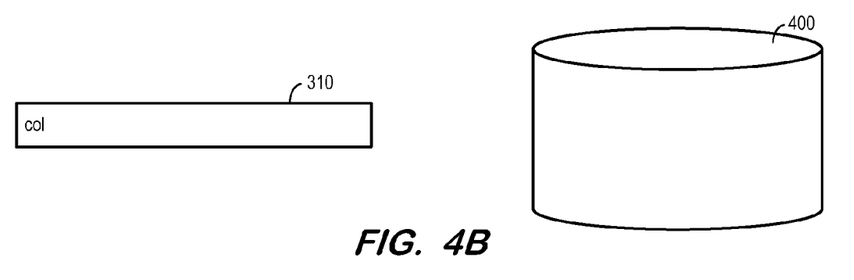
Figure 4C:
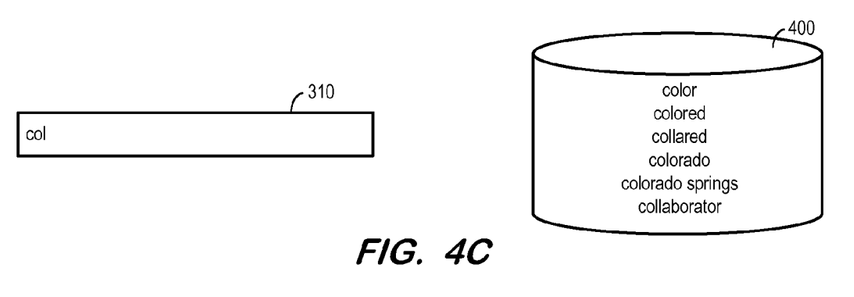

FIGS. 4A through 4C illustrate S210 through S225 according to some embodiments. Shown are input field 310 of interface 300 and cache 400, which may be implemented in RAM of information engine 130 or reporting client 120. FIG. 4A illustrates the entry of two characters into input field 310. The present example requires a partial query to consist of at least three letters, but embodiments are not thereby limited. FIG. 4B shows the entry of a third letter, forming the partial query "col", which is received at S210 by information engine 130.

Data source 110 is queried with the partial query (e.g., using a wildcard such as "col*") at S215 to identify data source terms including the partial query, and K data source terms are received in response. FIG. 4C shows six data source terms stored in cache 400 at S225. Each of the six terms includes the partial query. The K terms received at S220 may have included terms in addition to those illustrated, with the six terms having been selected based on their greater relevance scores.

Figure 4D:
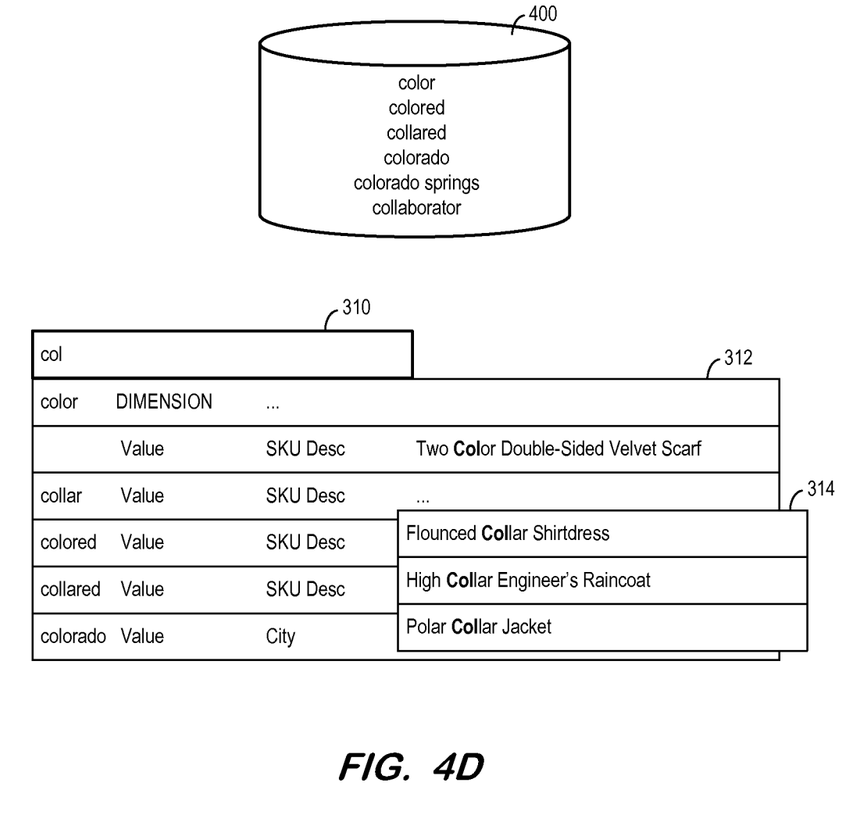

One or more (i.e., M, where M≦N) of the stored data source terms are presented to the user at S230. For example, to reduce user confusion, some embodiments present five or less of the stored data source terms at S230, regardless of how many terms are stored. FIG. 4D illustrates the current contents of cache 400 according to the present example, input field 310 including partial query "col", and suggestion rows 312 including the M data source terms which include the partial query. To illustrate a case where M<N, rows 312 do not present the stored term "colorado springs" even though this term includes the partial query.

In the present example, each data source term is presented in association with related metadata. Specifically, the metadata of FIG. 4D indicates whether the associated terms are dimensions or dimension values (including portions thereof) within data source 110. If a term is a dimension value (or portion thereof), also presented is the name of the corresponding dimension (e.g., SKU Desc, City). The metadata may have been received with each data source term at S220 as a result of the query of S215. Such presentation may assist the user in selecting the appropriate data source term.

In some instances, a presented data source term may be a portion of more than one value within data source 110. FIG. 4D, for example, shows that the term "collar" is present within three different stored dimension values. List 314 may be displayed to show all such values, either automatically or in response to input from the user (e.g., selecting or moving a cursor over the row 312 including "collar").

Flow pauses for user input at S235. In one alternative, the user may select one of the presented terms and then select Search icon 315. If so, flow proceeds to S240 to execute a search based on the selected term as is known in the art. As will be described below, the contents of the cache may be maintained after such a search and be used in subsequent executions of process 200.

Figure 4E:
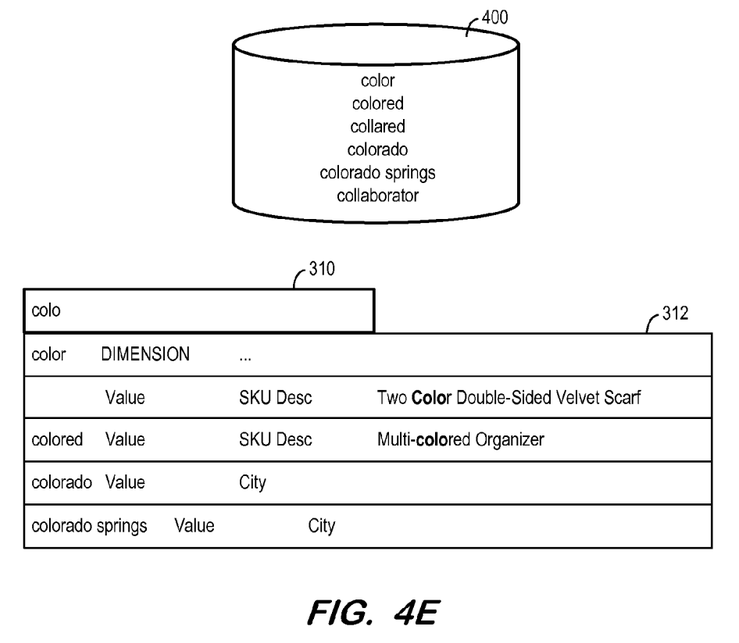

According to a second alternative, a next letter is input by the user and, as a result, a new partial query is received at S245. FIG. 4E illustrates the input of a letter "o", which causes the reception of the new partial query "colo" at S245. Next, at S250, it is determined whether one or more of the stored terms includes the new partial query. If so, as in the present example, then flow proceeds to S255 to present one or more of these stored terms (i.e., the terms including the new partial query) to the user.

FIG. 4E illustrates the presentation of stored terms "color", "colored", "colorado" and "colorado springs" to a user at S255. As shown, the terms "collar" and "collared" are no longer presented in rows 312 (in comparison to FIG. 4D) because those terms do not include the new partial query "colo".

Figure 4F:
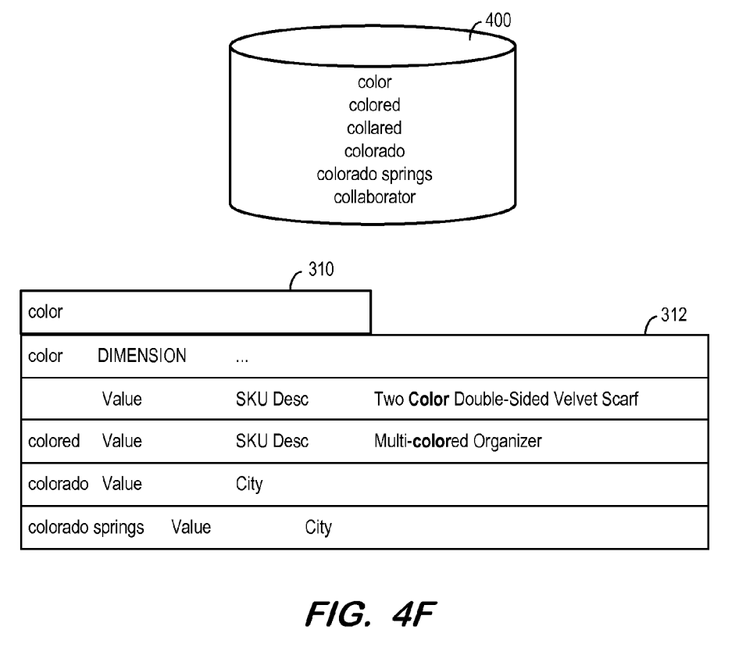

Flow returns from S255 to S235 and continues as described above. Continuing the present example, it is assumed that the letter "r" is input into input field 310 at S235, resulting in the reception of new partial query "color" at S245. Cache 400 is again checked at S250 to identify terms which include this query, and one or more of the identified terms are presented at S255. As shown in FIG. 4F, due to the specific contents of cache 400 in the present example, the resulting rows 312 are the same as shown in FIG. 4E.

Figure 4G:
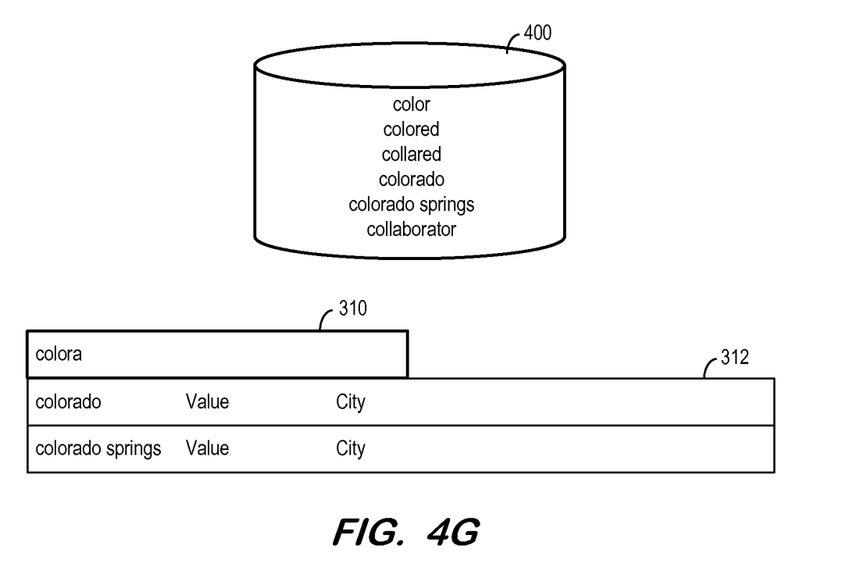

Furthermore, it will be assumed that flow again returns to S235 and the additional letter "a" is input. The newly-received partial query "colora" is compared with the terms of cache 400 at S250, the terms "colorado" and "colorado springs" are identified, and these terms are presented to the user at S255 as shown in FIG. 4G.

Figure 4H:
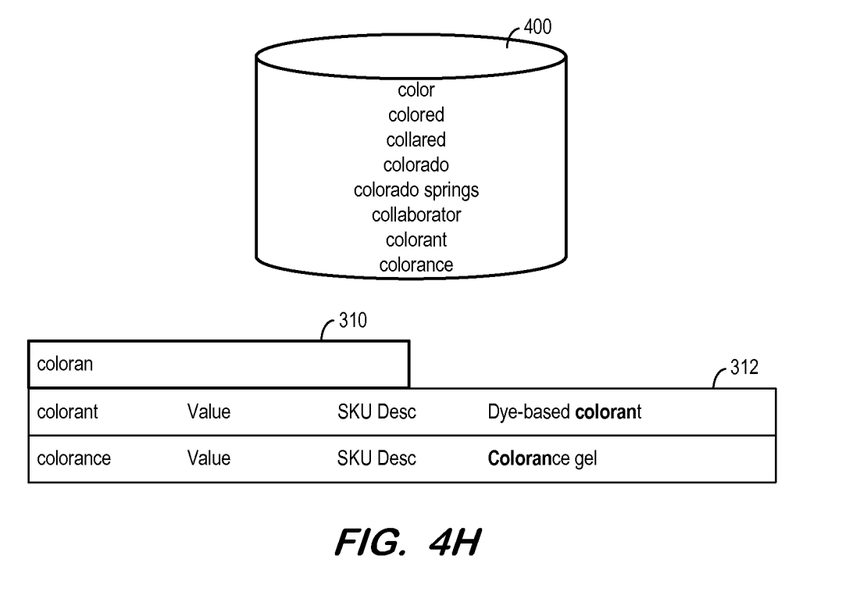

It will now be assumed that a further letter, "n", is next input at S235. At S250, it is then determined that none of the terms of cache 400 (as shown in FIG. 4G) includes the new partial query "coloran". Flow therefore returns from S250 to S215. As described above, data source 110 is queried with the partial query (i.e., "coloran") at S215 to identify data source terms including the partial query, K data source terms are received in response at S220, and N of the K data source terms are stored at S225. FIG. 4H shows cache 400 after performance of the foregoing with respect to the new partial query, in which the terms "colorant" and "colorance" have been added. Moreover, rows 312 of FIG. 4H present the cached terms including the new partial query to the user.

It will now be assumed that the user selects one of the presented terms of FIG. 4H for searching at S240. Data source 110 is therefore queried based on the selected term and search results are presented to the user as is known in the art.

Figure 4I:
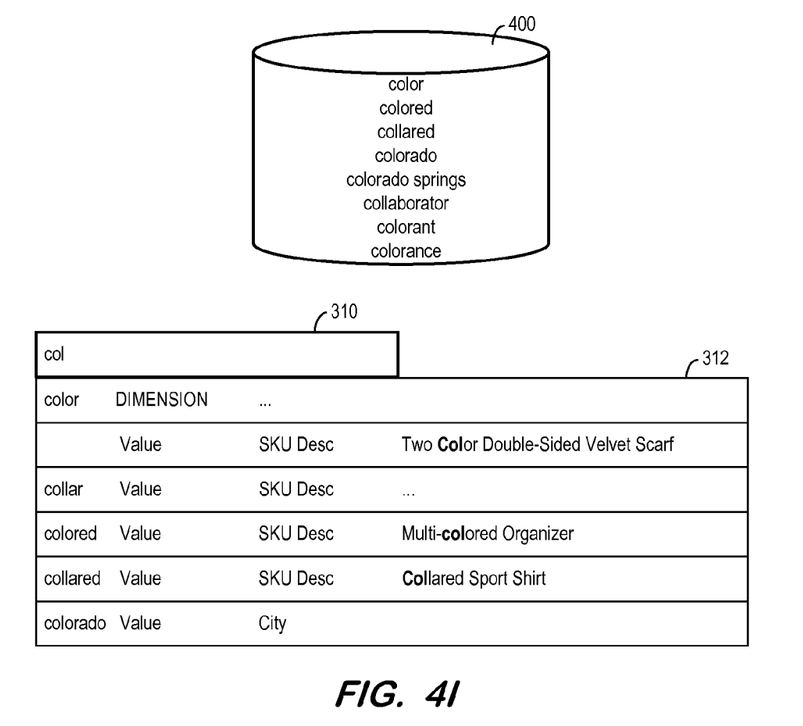

Later, a new partial query is received from the same user at S245. FIG. 4I illustrates an example in which the same user has again input the partial query "col" into input field 310. The contents of cache 400 remain the same as shown in FIG. 4H. Accordingly, the user is presented at S255 with the same terms in rows 312 as shown in FIG. 4D.

Figure 4J:
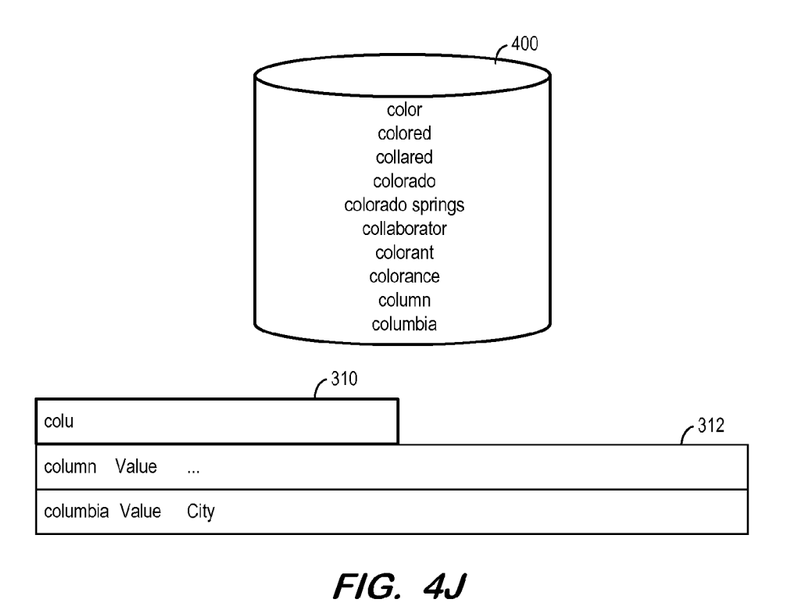

Next, at S235, the user inputs the letter "u", resulting in the reception of the new partial query "colu" at S245. Based on the current contents of cache 400, it is determined that none of the cached terms include this new partial query. Flow therefore returns from S250 to S215 to query data source 110 with the partial query (i.e., "colu"), to receive K data source terms in response at S220, and to store N of the K data source terms in cache 400 at S225. FIG. 4J shows cache 400 after performance of the foregoing with respect to the new partial query, in which the terms "column" and "columbia" have been added. Rows 312 of FIG. 4J present the cached terms including the new partial query to the user.

Process 200 continues to proceed as described above, adding terms to the user's cache based on partial queries received from the user. As the cache size increases, the need to execute queries at S215 decreases, improving response time. In order to limit the size of the cache, cached terms may be purged when the cache reaches a particular size. The purged terms may be the oldest terms, the least-recently-used terms, or any other suitable terms. According to some embodiments, a particular term is maintained in the cache for a maximum period (e.g., one day) and then purged.

In order to avoid unnecessary queries, some embodiments may, at S250, consider the number of results returned by a previously-run query. For example, if the previous query executed at S215 was based on the partial query color and returned three terms (out of a maximum K=100), then it might be determined that no query should be run in response to input of the letter "a" to create the new partial query "colora".

Figure 5:
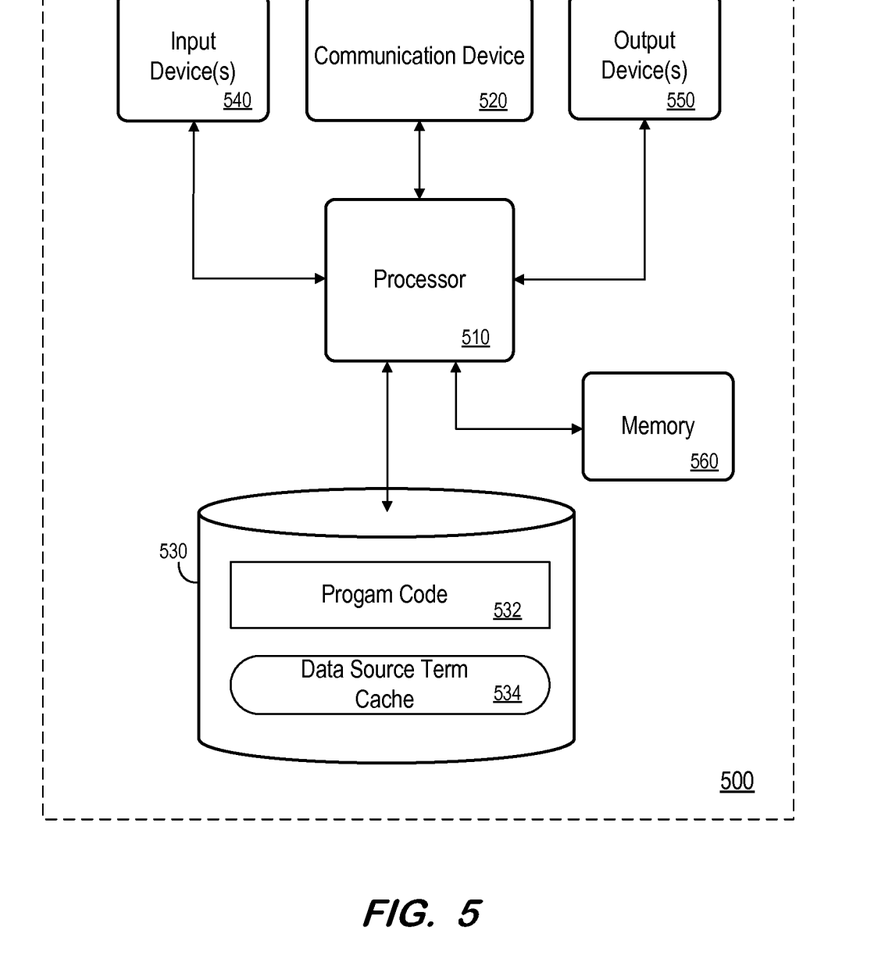
FIG. 5 is a block diagram of an apparatus according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of information engine 130. Apparatus 500 may include other unshown elements according to some embodiments.

Apparatus 500 includes processor 510 operatively coupled to communication device S20, data storage device 530, one or more input devices 540, one or more output devices 550 and memory 560. Communication device S20 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Program code 532 may be executed by processor 510 to cause apparatus 500 to perform any one or more of the processes described herein. Embodiments are not limited to execution of these processes by a single apparatus. Data source term cache 534 may include more than one user-specific cache as described herein, and may also or alternatively be stored in memory 560. Data storage device 530 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A non-transitory computer-readable medium storing program code, the program code executable by a processor to:
- receive a partial query from a user;
- query a data source with the partial query to identify terms within the data source including the partial query;
- store the identified terms in a cache that is associated with the user and separate from the queried data source;
- present the identified terms to the user;
- receive a new partial query including the partial query and a letter appended to the partial query;
- determine if one or more of the identified terms stored in the cache includes the new partial query;
- if it is determined that one or more of the identified terms stored in the cache includes the new partial query, present the one or more of the identified terms to the user without querying the data source with the new partial query; and
- if it is determined that none of the identified terms stored in the cache includes the new partial query, then:
  - query the data source with the new partial query to identify second terms within the data source including the new partial query;
  - store the identified second terms in the cache that is associated with the user and separate from the queried data source; and
  - present the identified second terms to the user.

2. A non-transitory computer-readable medium according to claim 1, the program code further executable by a processor to:
- after presentation of the one or more of the stored identified terms to the user, receive a second new partial query including the new partial query and a letter appended to the new partial query;
- determine if a second one or more of the stored identified terms includes the second new partial query;
- if the second one or more of the stored identified terms includes the second new partial query, present the second one or more of the stored identified terms to the user; and
- if none of the stored identified terms includes the second new partial query, then:
  - query the data source with the second new partial query to identify third terms within the data source including the second new partial query;
  - store the identified third terms in the cache associated with the user; and
  - present the identified third terms to the user.

3. A non-transitory computer-readable medium according to claim 1, the program code further executable by a processor to:
- receive a selection of one of the presented one or more identified terms from the user;
- request a search of the data source based on the selected one of the presented one or more identified terms;
- receive a second partial query from the user;
- determine if one or more of the stored identified terms includes the second partial query;
- if one or more of the stored identified terms includes the second partial query, present the one or more of the stored identified terms to the user; and
- if none of the stored identified terms includes the second partial query, then:
  - query the data source with the second partial query to identify second terms within the data source including the second partial query;
  - store the identified second terms in the cache associated with the user; and
  - present the identified second terms to the user.

4. A non-transitory computer-readable medium according to claim 1,
wherein K terms within the data source including the partial query are identified, N of the K terms are stored in the cache associated with the user, and M of the N stored terms are presented to the user, and
wherein M<N<K.

5. A non-transitory computer-readable medium according to claim 1, wherein presentation of the identified terms to the user comprises presentation of metadata associated with each of the presented identified terms, and
wherein the metadata is stored in the cache.

6. A non-transitory computer-readable medium according to claim 1, wherein the data source is queried under the authorization credentials of the user.

7. A method implemented by a computing system in response to execution of program code by a processor of the computing system, comprising:
- receiving a partial query from a user;
- querying a data source with the partial query to identify terms within the data source including the partial query;
- storing the identified terms in a cache that is associated with the user and separate from the queried data source;
- presenting the identified terms to the user;
- receiving a new partial query including the partial query and a letter appended to the partial query;
- determining if one or more of the identified terms stored in the cache includes the new partial query;
- if it is determined that one or more of the identified terms stored in the cache includes the new partial query, presenting the one or more of the identified terms to the user without querying the data source with the new partial query; and
- if it is determined that none of the identified terms stored in the cache includes the new partial query, then:
  - querying the data source with the new partial query to identify second terms within the data source including the new partial query;
  - storing the identified second terms in the cache that is associated with the user and separate from the queried data source; and
  - presenting the identified second terms to the user.

8. A method according to claim 7, further comprising:
- after presentation of the one or more of the stored identified terms to the user, receiving a second new partial query including the new partial query and a letter appended to the new partial query;
- determining if a second one or more of the stored identified terms includes the second new partial query;
- if the second one or more of the stored identified terms includes the second new partial query, presenting the second one or more of the stored identified terms to the user; and
- if none of the stored identified terms includes the second new partial query, then:
  - querying the data source with the second new partial query to identify third terms within the data source including the second new partial query;
  - storing the identified third terms in the cache associated with the user; and
  - presenting the identified third terms to the user.

9. A method according to claim 7, further comprising:
receiving a selection of one of the presented one or more identified terms from the user;
requesting a search of the data source based on the selected one of the presented one or more identified terms;
receiving a second partial query from the user;
determining if one or more of the stored identified terms includes the second partial query;
if one or more of the stored identified terms includes the second partial query, presenting the one or more of the stored identified terms to the user; and
if none of the stored identified terms includes the second partial query, then:
  querying the data source with the second partial query to identify second terms within the data source including the second partial query;
  storing the identified second terms in the cache associated with the user; and
  presenting the identified second terms to the user.

10. A method according to claim 7,
wherein K terms within the data source including the partial query are identified, N of the K terms are stored in the cache associated with the user, and M of the N stored terms are presented to the user, and
wherein M<N<K.

11. A method according to claim 7, wherein presentation of the identified terms to the user comprises presentation of metadata associated with each of the presented identified terms, and
wherein the metadata is stored in the cache.

12. A method according to claim 7, wherein the data source is queried under the authorization credentials of the user.

13. A system comprising:
a data storage device storing data;
a computing device comprising:
  a data cache;
  a memory storing processor-executable program code; and
  a processor to execute the processor-executable program code in order to cause the computing device to:
receive a partial query from a user;
query a data source with the partial query to identify terms within the data source including the partial query;
store the identified terms in a cache that is associated with the user and separate from the queried data source;
present the identified terms to the user;
receive a new partial query including the partial query and a letter appended to the partial query;
determine if one or more of the identified terms stored in the cache includes the new partial query;
if it is determined that one or more of the identified terms stored in the cache includes the new partial query, present the one or more of the identified terms to the user without querying the data source with the new partial query; and
if it is determined that none of the identified terms stored in the cache includes the new partial query, then:
  query the data source with the new partial query to identify second terms within the data source including the new partial query;
  store the identified second terms in the cache that is associated with the user and separate from the queried data source; and
  present the identified second terms to the user.

14. A system according to claim 13, the processor to further execute the processor-executable program code in order to cause the computing device to:
receive, after presentation of the one or more of the stored identified terms to the user, a second new partial query including the new partial query and a letter appended to the new partial query;
determine if a second one or more of the stored identified terms includes the second new partial query;
if the second one or more of the stored identified terms includes the second new partial query, present the second one or more of the stored identified terms to the user; and
if none of the stored identified terms includes the second new partial query, then:
  query the data source with the second new partial query to identify third terms within the data source including the second new partial query;
  store the identified third terms in the cache associated with the user; and
  present the identified third terms to the user.

15. A system according to claim 13, the processor to further execute the processor-executable program code in order to cause the computing device to:
receive a selection of one of the presented one or more identified terms from the user;
request a search of the data source based on the selected one of the presented one or more identified terms;
receive a second partial query from the user;
determine if one or more of the stored identified terms includes the second partial query;
if one or more of the stored identified terms includes the second partial query, present the one or more of the stored identified terms to the user; and
if none of the stored identified terms includes the second partial query, then:
  query the data source with the second partial query to identify second terms within the data source including the second partial query;
  store the identified second terms in the cache associated with the user; and
  present the identified second terms to the user.

16. A system according to claim 13,
wherein K terms within the data source including the partial query are identified, N of the K terms are stored in the cache associated with the user, and M of the N stored terms are presented to the user, and
wherein M<N<K.

17. A system according to claim 13, wherein presentation of the identified terms to the user comprises presentation of metadata associated with each of the presented identified terms, and
wherein the metadata is stored in the cache.

18. A system according to claim 13, wherein the data source is queried under the authorization credentials of the user.

* * * * *